United States Patent [19]

Hein

[11] Patent Number: 4,858,196
[45] Date of Patent: Aug. 15, 1989

[54] POWER SUPPLY ARRANGEMENT
[75] Inventor: Gerd Hein, Herzogenaurach, Fed. Rep. of Germany
[73] Assignee: Siemens Aktiengesellschaft, Berlin and Munich, Fed. Rep. of Germany
[21] Appl. No.: 160,441
[22] Filed: Feb. 25, 1988
[30] Foreign Application Priority Data
  Jul. 17, 1987 [DE] Fed. Rep. of Germany ....... 3723727
[51] Int. Cl.⁴ .............................................. G11C 7/00
[52] U.S. Cl. ..................................... 365/229; 365/226
[58] Field of Search ............... 365/226, 227, 228, 229; 371/66; 307/66

[56] References Cited
U.S. PATENT DOCUMENTS

| 4,122,359 | 10/1978 | Breikss ........................ 365/229 X |
| 4,399,524 | 8/1983 | Muguruma et al. ............... 365/229 |
| 4,422,163 | 12/1983 | Oldenkamp ..................... 365/229 |
| 4,531,214 | 7/1985 | Torres et al. .................. 371/66 |
| 4,669,066 | 5/1987 | Kagawa et al. .................. 365/229 |

FOREIGN PATENT DOCUMENTS
3525061 1/1987 Fed. Rep. of Germany .

Primary Examiner—Joseph A. Popek

[57] ABSTRACT

A power supply arrangement (2) with a first controlled power output (12) and a second controlled output (26) also has a controlled backup output (16) which is connected by means of a buffered bus with several read/write memories (8) of a computer (4). The read/write memories (8) of the computer (4) can be switched over to a stand-by mode in case of a power failure and connected with a backup battery (20). In accordance with the invention, the read/write memories (8) are switched during normal network operation to an active operating mode connected by means of a low-impedance switch (34) with the controlled power output (12). The low-impedance switch (34) is controlled by means of a switching signal ($U_{S1}$). The backup battery (20) is connected with the controlled backup output (16) via a second switch (46) and a series controller (48).

4 Claims, 3 Drawing Sheets

POWER SUPPLY ARRANGEMENT

BACKGROUND OF THE INVENTION

The invention relates to a power supply arrangement with a first controlled power output, a second controlled output, and a controlled backup output which is connected to several read/write memories of a computer, and in which the read/write memories can be switched over to a stand-by mode in case of a power failure and connected to a backup battery.

Power supply arrangements for computers which supply several controlled output voltages are commercially available. In these arrangements, the computer components are connected by means of a d.c. (direct current) bus with a controlled power output of the power supply arrangement. The dynamic read/write memories of the computer are connected via a backup bus with still another controlled output, which in case of a power failure is supplied by a backup battery. The read/write memories require a direct voltage of 5 V (volts) and a current of 3.5 A (amperes) for active operation and of 1.5 A in the stand-by mode. This power supply to the read/write memories is managed either by adjusting an existing voltage of the power supply arrangement or by means of a voltage source expressly designed for this purpose. If an existing voltage is to be adjusted, then this voltage must be adjusted to the voltage values of the read/write memories by means of a controllable switch, a smoothing device, a current/voltage regulating circuit, and a control circuit for the switch. Since the buffering runs low, the control circuit of the controllable switch is of the discrete component design. The drawback of such an adjustment of an existing voltage or of a power supply expressly constructed for the read/write memories is that the power supply arrangement then requires an extensive number of components and thus occupies a large amount of space.

There is a need to improve the power supply arrangement of the above-mentioned type in such a way as to reduce the number of components required as well as to reduce the attendant bulk.

SUMMARY OF THE INVENTION

With the novel power supply arrangement in accordance with the present invention, the read/write memories are switched during normal network operation to an active operating mode and are connected by means of a low-impedance switch with a controlled power output, the low-impedance switch being controlled by means of a switching signal and the backup battery being connected with the controlled buffer output via a second switch and a series controller.

In this power supply arrangement, the adjusted voltage for the computer components is sent to the backup output of the power supply arrangement via a low-impedance switch. The low-impedance switch is controlled in such a way that the high current of the power output of the power supply arrangement is adjusted to a current value of 3.5 A during active operation of the read/write memories. This requires nothing more than a current-detecting device. In a stand-by mode, the read/write memories are supplied by a backup battery which is connected with the buffer output via a second switch with a longitudinal controller. The series controller adjusts the battery voltage down to the supply voltage for the read/write memories and adjusts the current down to the stand-by value. During normal operation of the power supply arrangement, the backup battery is separated from the backup output by the second switch, so that the backup battery will not feed power into the backup output and thus drain itself.

Because of the low-impedance coupling of the power output and the backup output, the backup output is regulated at the same time through the main control, so that now only the current of the backup output requires limiting by current-limiting means to the current value required for the active operation of the read/write memories. In this manner, the number of required components, as well as the space requirements for the power supply arrangement, are substantially reduced.

The backup battery is connected with the second controlled output via a load circuit comprised of a second series controller and a relay, with the connecting point between the second series controller and the relay being connected with an input of the second switch. The battery is continuously charged through this load circuit while the series controller adjusts the second controlled output voltage down to a supply voltage. The relay is provided so that the battery will not run too low in the stand-by mode. The same relay is also activated in case of overvoltages. When the low-impedance switch is switched on, the second switch goes to the OFF position only after a pre-determined time lag and upon the occurrence of trouble in the network. The low-impedance switch changes to the OFF position only when the second switch is closed after a pre-determined time lag. This overlap in time between the low-impedance switch and the second switch ensures an uninterrupted voltage supply to the buffered read/write memories, regardless of the status of the mains or of the power supply arrangement. In addition, provision has been made so that in the event of trouble with the network there will be sufficient time to shift the data currently in the computer components to the read/write memories which have been switched to the stand-by mode.

BRIEF DESCRIPTION OF THE DRAWINGS

The invention is explained in greater detail, with reference to the drawings.

DETAILED DESCRIPTION

Figure 1:
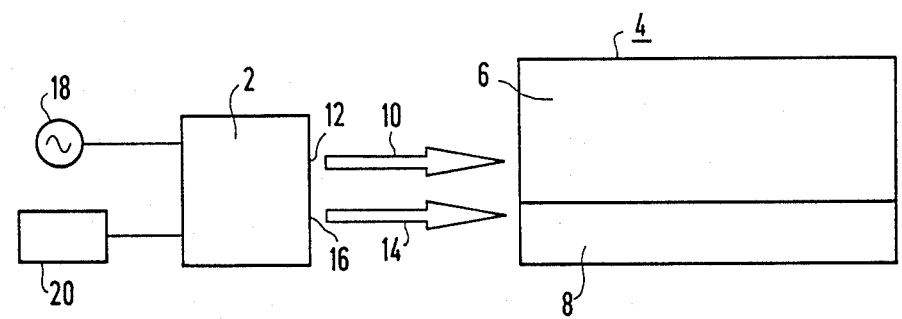
FIG. 1 shows a schematic flow diagram of a power supply arrangement with a computer in accordance with one embodiment of the invention.

In FIG. 1, a power supply arrangement 2 is shown as a unit supplying a computer 4. The computer 4 consists of computer components 6 and several read/write memories represented collectively as a unit 8. The computer components 6 are connected to a controlled power output 12 of the power supply arrangement 2, via a d.c. bus 10. The read/write memories 8 are connected to a buffer output 16 of the power supply arrangement 2 via a buffer bus 14. On the input side, the power supply arrangement 2 is connected to an AC power line 18 on the one hand and a buffer battery 20 on the other hand. The buffer battery 20 is provided so that in the event of a power failure of the network or an interruption in power, the needed current can be delivered by this buffer battery 20 to a number of read/write memories 8 which have been switched to the stand-by mode. In this way, data from the computer 4 can still be saved in the read/write memories 8.

Figure 2:
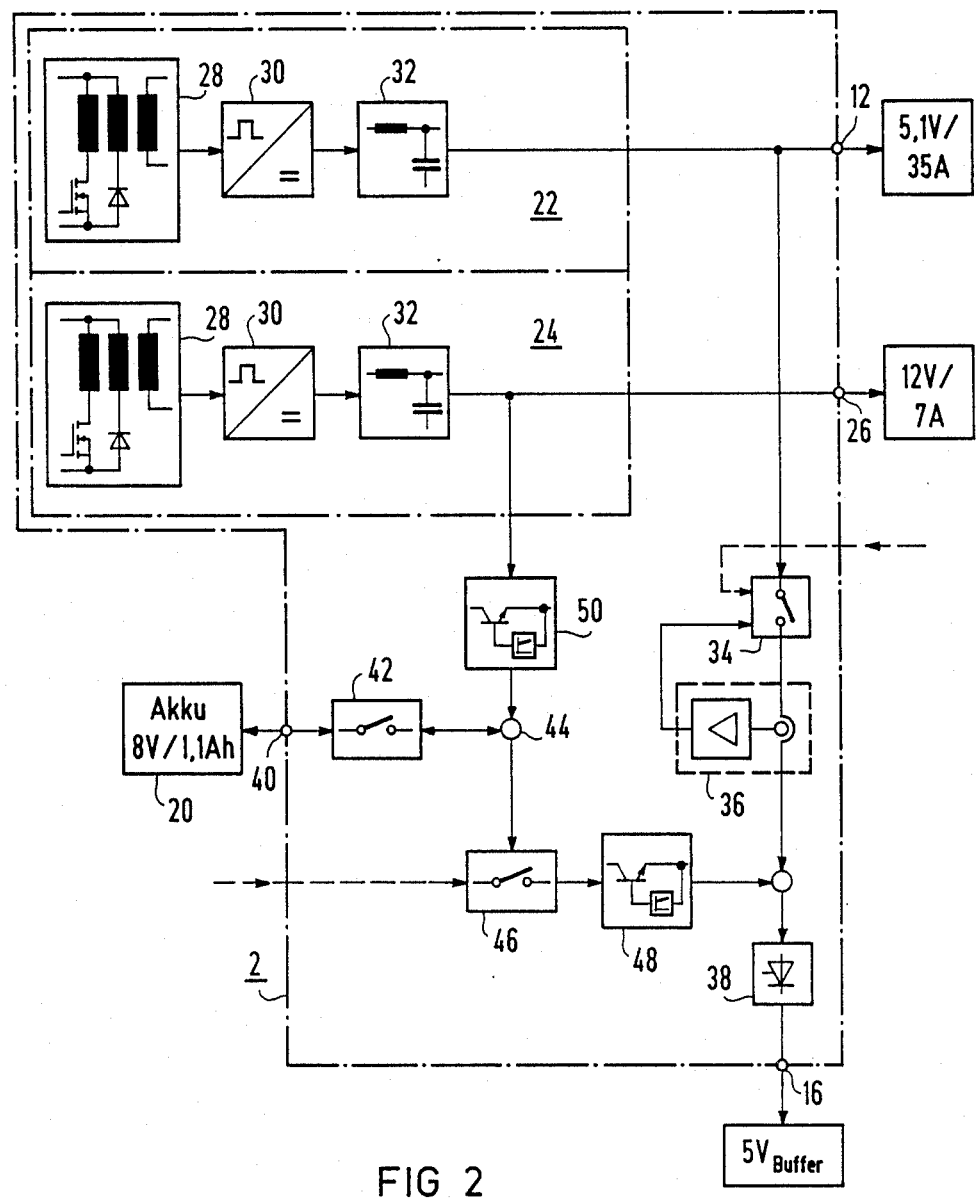
FIG. 2 is a schematic circuit diagram of the power supply of the arrangement FIG. 1.

FIG. 2 shows a schematic diagram of the power supply arrangement 2 in accordance with FIG. 1. This power supply arrangement 2 has two synchronized primary circuit elements 22 and 24. The circuit element 22 delivers an adjusted voltage with an amplitude of 5.1 V and a current with an amplitude of 35 A at the power output. The circuit element 24, at its output 26, delivers a voltage with an amplitude of 12 V and a current with an amplitude of 7 A. The two synchronized primary circuit elements consist in this case of a switched mode supply unit 28 which generates a pulse sequence from the alternating line voltage. The conversion is indicated by just a transformer with a primary switch, for greater clarity in the presentation. The generated pulse sequence is converted into a pulsating alternating voltage by means of a converter 30, which is smoothed by a damping element 32 consisting of a choke and a capacitor. Control elements and regulators of the synchronized primary circuit elements 22 and 24 are not shown, in order to simplify the presentation. The output of the damping element 32 of the circuit element 22 is connected to the controlled power output 12 of the power supply arrangement 2 on the one hand and, on the other hand via a low-impedance switch 34 of a current-detecting device 36 and an overvoltage protector 38 with the buffer output 16 of the power supply arrangement 2. A back-up battery 20 connected to the one input 40 of the power supply arrangement 2 is connected with the overvoltage protector 38 via a relay 42, a connecting point 44, a second switch 46 and a series controller 48. An 8 V, 1.1 ampere-hour lead storage battery serves as the buffer battery 20. The connecting point 44 is also connected via a further series controller 50 with the output of the damping segment 32 of the circuit element 24. The backup battery 20 is continuously charged via the above-mentioned series controller 50; i.e., the series controller 50 regulates the output voltage of the circuit element 24 from 12 V down to the charging voltage of 9 V, 0.5 A. The series controller 48 regulates the battery voltage in the backup operation from 8 V down to between 4.9 V and 5.1 V, while the current for the stand-by mode of the read/write memories 8 is simultaneously limited to 1.5 A. The low-impedance switch 34 is controlled by means of a switching signal $U_{S1}$, operating as a function of the power supply network.

Figure 3:
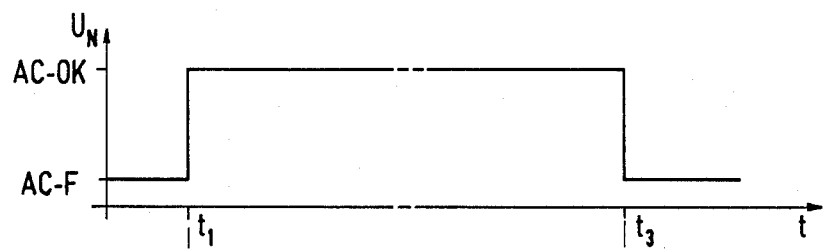
FIGS. 3 and 4 are voltage diagrams showing the condition of signals from the mains and the power supply arrangement in a diagram of the time segment t.
Figure 4:
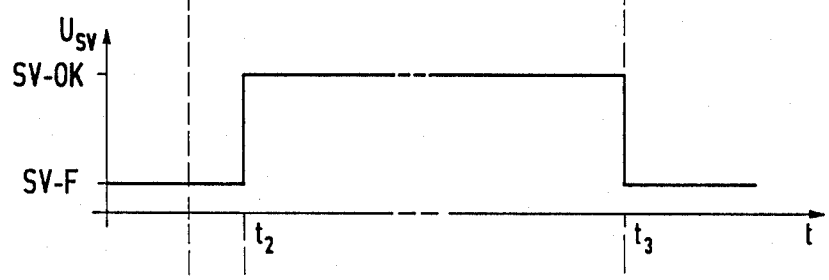
Figure 5:
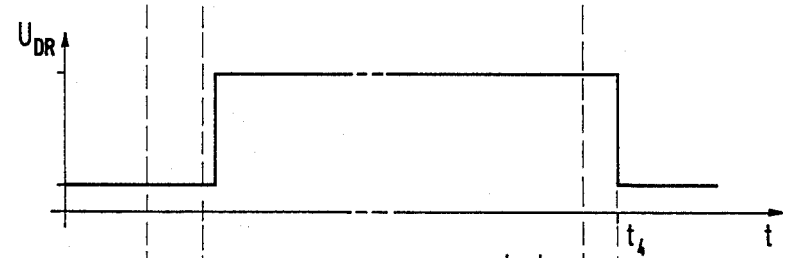
FIG. 5 shows a data rescue signal in a diagram of the time segment t.
Figure 6:
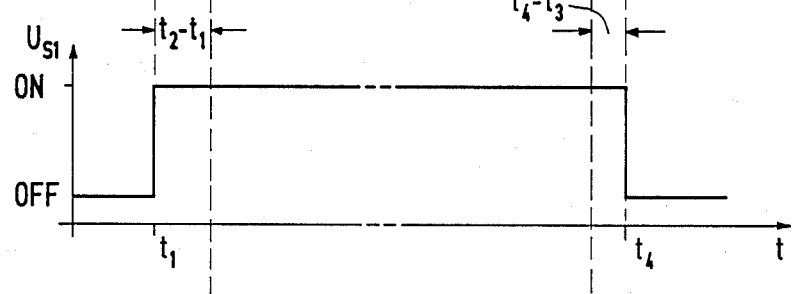
FIGS. 6 and 7 show switching signals in a diagram of the time segment t.
Figure 7:
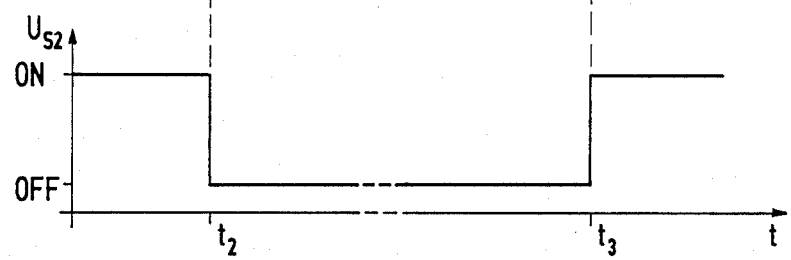

The manner in which the power arrangement 2 in accordance with FIG. 1 functions is explained with reference to FIGS. 3 through 7. In FIG. 3, a condition signal $U_N$ from the network is shown in a diagram of the time segment t, in which a HIGH condition AC-OK indicates that the AC network is in order. The LOW condition AC-F shows that there is trouble with the network, such as a power failure or a temporary power interruption. At the instant $t_1$, the line voltage is back, whereupon the condition signal $U_N$ jumps from LOW condition AC-F back to HIGH condition AC-OK. By this recovery of the normal network condition, the controlled output voltages of the power supply arrangement 2 are built up. At the instant $t_2$, a HIGH condition $SV_{OK}$ of the condition signal $U_{SV}$ of the power supply arrangement 2 indicates that the ouput voltages are in order, as shown in FIG. 4. With the return of the normal network condition, the low-impedance switch 34 is closed, which is indicated by a HIGH signal ON of the switching signal $U_{S1}$, as shown in FIG. 6. At the instant $t_1$, the second switch 46 is still switched ON. This is indicated by the HIGH signal ON of the switching signal $U_{S2}$ as shown in FIG. 7. Only at the instant $t_2$, when the output voltages of the power supply arrangement 2 are built up, is the second switch 46 opened, i.e., the switching signal $U_{S2}$ changes from HIGH condition ON to LOW condition OFF as shown in FIG. 7. The time lag between $t_2$ and $t_1$ is about 100–200 ms (milliseconds). This overlap in time ensures an uninterrupted voltage supply. From the instant $t_2$ on, the power supply arrangement 2 is in the normal network operation condition. In this condition, the read/write memories 8 of the computer 4 are in the active mode and are supplied with a current limited to an amplitude of 3.5 A from the switched mode supply circuit 22 through the low-impedance switch 34 and the backup bus 14. Thus, the output voltage at the backup output 16 is also simultaneously regulated by the circuit element 22. At the same time, the backup battery 20 is continuously charged via the series controller 50.

At the instant $t_3$ the condition signal $U_N$ from the network changes because of trouble from a HIGH condition AC-OK to a LOW condition AC-F, as shown in FIG. 3. At the same time, the condition signal $U_{SV}$ of the power supply arrangement 2 goes from a HIGH condition SV-OK to a LOW condition SV-F, as shown in FIG. 4. Simultaneously with these signals $U_N$ and $U_{SV}$, the second switch 46 is closed, as is indicated by the change of the switching signal $U_{S2}$ from a LOW condition OFF to a HIGH condition ON at the instant $t_{33}$, as shown in FIG. 7. At the instant $t_3$, the low-impedance switch 34 is still closed. Only at the instant $t_4$ is the low-impedance switch 34 opened, as is indicated by the change in the switching signal $U_{S1}$ from a HIGH condition ON to a LOW condition OFF, as shown in FIG. 6. In addition, the data rescue signal $U_{DR}$ changes from a HIGH condition to a LOW condition, as shown in FIG. 5. The time lag between $t_4$ and $t_3$ is predetermined so that the data in the computer 4 can be read into the read/write memories 8 during this time lag between $t_4$ and $t_3$ and so that the read/write memories 8 can be switched from active operation to a stand-by status. The time lag between $t_4$ and $t_3$ amounts to some 2 to 2.9 ms. From this instant $t_4$ on, the power supply arrangement 2 is in a stand-by mode, during which the read/write memories 8 are supplied by the backup battery 20 with the current limited to 1.5 A. In order to ensure that the buffer battery 20 does not run too low, a relay 42 is provided as protection.

I claim:

1. A power supply arrangement of the type having a controlled operating power output and a controlled buffer output, the buffer output being connected to a plurality of read-write memories of a computer, the read-write memories being switched to a stand-by mode and connected to a back-up power source upon a failure of the line voltage, the improvement therein comprising:

low impedance first switch means responsive to a first switch control signal for connecting the read-write memories for active operation to the power output during normal line conditions, and second switch means responsive to a second switch control signal for connecting the back-up power source via a first series controller to the buffer output.

2. The power supply arrangement as defined in claim 1, comprising:
    means including a load circuit comprising in a series connection a second series controller and relay for connecting the back-up power source to the buffer output, the common node of the second series controller and the relay being connected to an input of the second switch.

3. The power supply arrangement as defined in claim 1, comprising:
    means for preventing the second switch from opening before a first predetermined time period after the low impedance first switch is closed.

4. The power supply arrangement as defined in claim 3, comprising:
    means for preventing the low-impedance switch from opening before a second predetermined time period after the second switch is closed.

* * * * *